Feb. 19, 1935. J. O'CALLAGHAN 1,992,089
APPARATUS FOR MAKING MALT BEVERAGES
Filed April 7, 1930 2 Sheets-Sheet 1

Inventor
JOSEPH O'CALLAGHAN.
By Sol Shappiris
Attorney

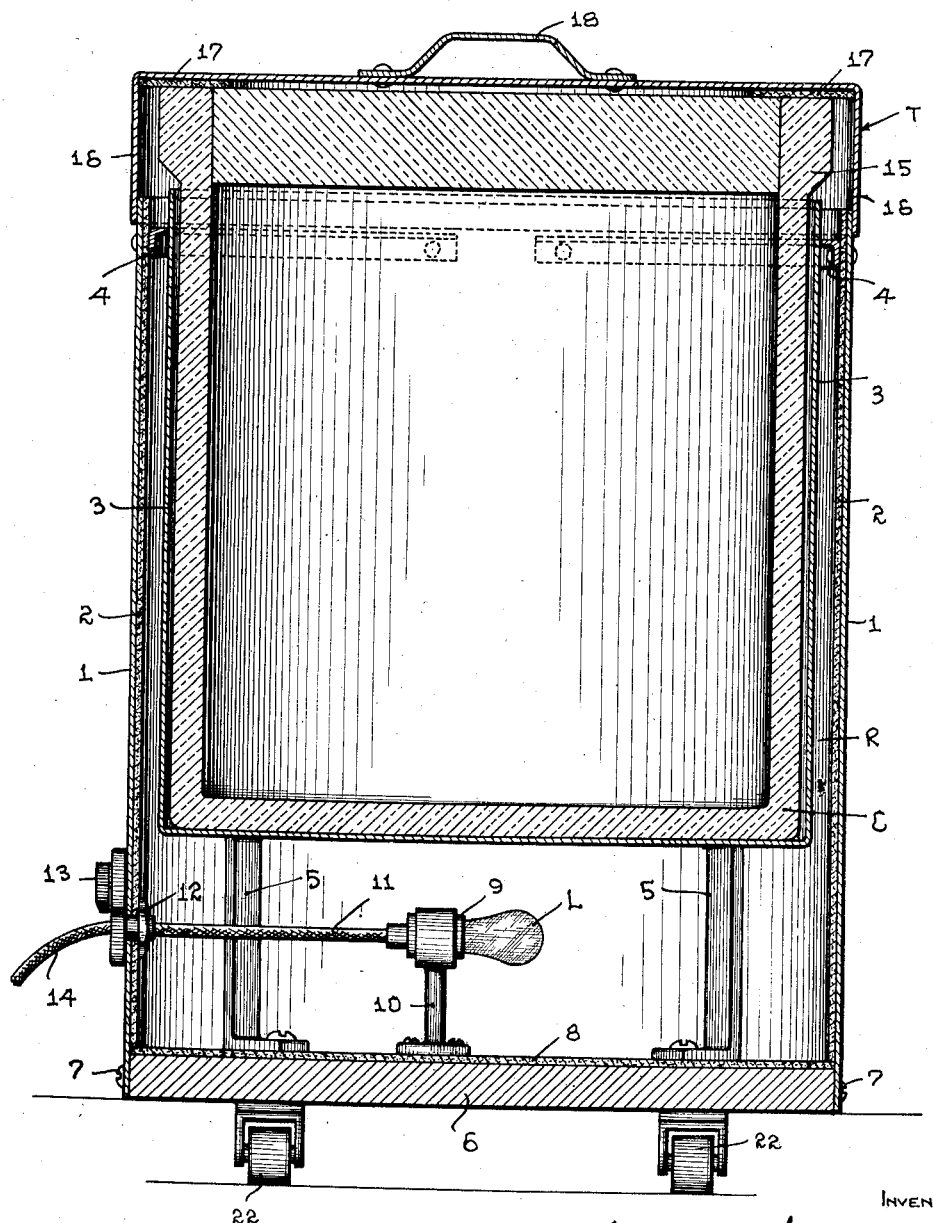

Patented Feb. 19, 1935

1,992,089

UNITED STATES PATENT OFFICE 1,992,089

APPARATUS FOR MAKING MALT BEVERAGES

Joseph O'Callaghan, Cleveland, Ohio, assignor of one-half to Sidney H. Moss, Cleveland, Ohio Application April 7, 1930, Serial No. 442,415

5 Claims. (Cl. 219—45)

This invention relates to apparatus and method for making malt beverages, and is particularly concerned with apparatus and method for preparing such malt beverages under controlled conditions.

In prior methods of preparing malt beverages, no attempt was generally made particularly when such beverages were prepared in relatively small quantities, to control the temperature under which the fermentation was carried out. As the result, the product was frequently spoiled or deteriorated in quality due to a number of reasons. For example, chilling which sometimes took place where no effort was made to control temperatures, resulted in a much inferior product and frequently the entire product had to be discarded. In addition, in the ordinary processes utilized particularly without control, there was a production of scum which appeared on the top of the mash or fermenting mass, and this scum frequently fell back into the solution or mixture below it, spoiling the entire batch. In addition, the old methods where heat control was not utilized, resulted in a product with considerable sediment that could not readily be removed. And finally it may be noted that such prior processes required a considerable length of time in order that the product might be satisfactorily completed.

Among the objects of the present invention are apparatus and methods for avoiding the difficulties of the prior processes and for producing superior products in preventing spoiling and chilling for the reasons noted above, in producing products with very little sediment and any sediment present is of a nature so that it can be readily strained out if desired, and in materially reducing the time element required in order to bring a batch under treatment to completion.

Other and further objects and advantages will appear from the more detailed description set forth below, it being understood, however, that this more detailed description is given by way of illustration only, and not by way of limitation, since various changes therein may be made by those skilled in the art without departing from the scope and spirit of the present invention.

Figure 1:
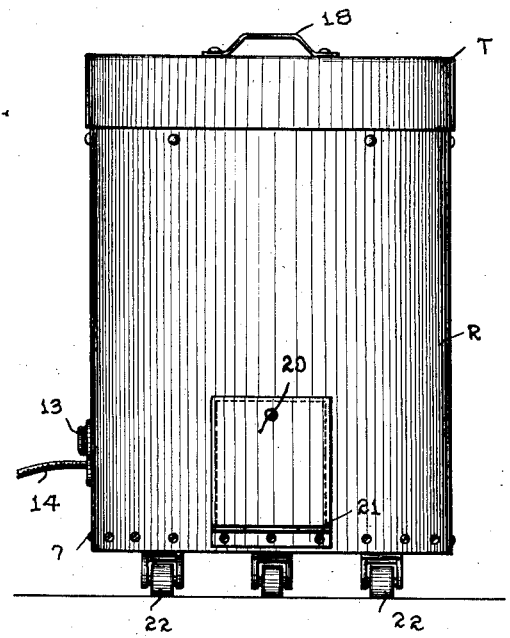
Figure 2:
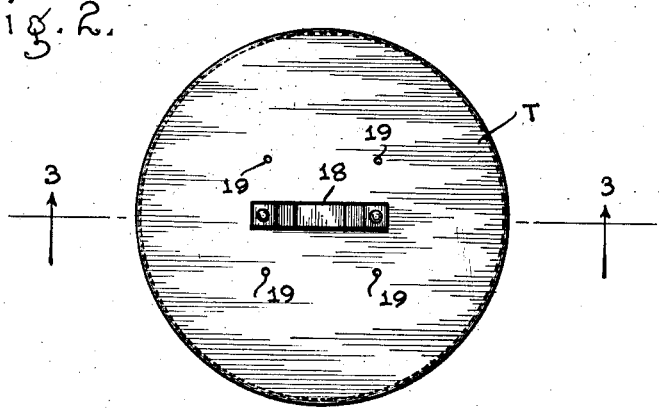

In connection with that more detailed description, there is shown in the drawings, in Figure 1 a front elevation of the apparatus with the cover attached; in Figure 2 a top plan view of the apparatus of Figure 1; and in Figure 3 a vertical section through the apparatus of Figure 1 taken on line 3—3 of Figure 2.

In carrying out the invention disclosed herein, there is particularly utilized apparatus and method for controlling the temperature of the mash or material undergoing fermentation by supplying a mild and controlled heat thereto, and maintaining the desired temperature during the entire treatment of the batch.

A preferred form of the apparatus or device desirably used in carrying out the present invention is shown in the drawings. The receptacle R is desirably formed as a cylindrical vessel having an outer wall 1 desirably formed of sheet metal, such as sheet iron, and desirably provided with a heat-insulating lining 2, which may be of asbestos, felt, or other heat-insulating material. The receptacle is also provided with an inner wall 3 carried within the outer wall 1 of the receptacle, the side and bottom walls of the inner vessel constituting the inner wall of receptacle R being spaced from the outer wall 1 of the receptacle, by means of angle irons 4, 4 riveted to the outer wall of the receptacle R near the upper periphery thereof, and angle irons 5, 5 resting on the base of the device and supporting the bottom of the inner wall 3. Desirably the inner wall of the receptacle R is made of a single continuous piece of sheet metal, such as sheet iron, and is also cylindrical in contour, so that when supported within the outer wall 1 of the receptacle, a heat passageway or chamber is provided between the spaced walls and the bottom. The lower periphery of the outer wall 1 of the receptacle R carries a desirably cylindrical base 6, which may be attached to the wall 1 as by screws 7, 7, and the base 6 is desirably provided with a heat insulating lining 8 continuous therewith so that the entire inner walls and bottom are heat insulated from the outside atmosphere. Any number of angle irons 4, 4 and 5, 5 may be utilized for spacing the inner vessel within the outer walls of the receptacle R, three of each serving satisfactorily for ordinary sized apparatus of this character.

For supplying heat within the spaced wall passage of the receptacle R, and desired heating means may be utilized such as incandescent lamps, resistance coils, etc. But for ordinary purposes, the incandescent lamp is highly satisfactory. In such case, the incandescent lamp L carried in socket 9 is mounted on the socket holder or bracket 10 supported on the base or bottom 6. The usual flexible conductor 11 leads to an outlet 12 in the lower bottom portion of the outer wall 1 of the receptacle R, to an adjacent switch 13, which supplies and controls the current admitted to the heating element L. The conductor 11 continues from the switch as cord 14 (fragmentarily shown) and serves for connection to any suitable source of current (not shown).

The inner wall and bottom 3 of the receptacle R serve to receive a container C which is adapted to receive the mash or other fermenting material or substances to be treated. This container C is desirably provided with side walls which extend above the inner wall 3 of the receptacle R as shown at 15. The upper extending wall 15 of the container C, which may be an ordinary crock, therefore, serves as a continuation of the inner wall 3 above the ordinary height of the receptacle R.

A top or cover T is desirably supplied to cover the container C and the top T is provided with depending side walls 16 spaced from the upper portions 15 of the container C. The depending walls 16 of the top T are adapted to closely or snugly embrace the extreme upper periphery of the outer wall 1 of the receptacle R, so that the depending side walls 16 of the top T serve substantially as a continuation of the outer wall 1 of the receptacle R above the normal height of that receptacle R. Consequently a space or passage is provided between the upper portion 15 of the container C and the dependent side walls 16 of the top T which serves as a continuous heating passage or chamber joined with that between the walls 1 and 3 of the receptacle R. The top T, therefore, serves not only as a cover or closure for the container C but also as a closure for the heating space between the walls of of the receptacle R and the upper portion 15 of the container C and the dependent walls 16 of the top T. This top T is further desirably supplied with a heat insulating annular member which may be felt or asbestos, or other desired material, 17 which serves to heat insulate the upper portion of the continuous heating chamber referred to above. The dependent side walls 16 of the top T may also be heat insulated if desired, but this has not been found to be necessary. The top or cover T is desirably supplied with a handle 18 riveted thereto.

The top T is also desirably provided with openings 19, 19 to allow the escape of gases, etc. formed during the process.

The receptacle R is desirably provided with a door 20 in its lower outer wall hinged at 21 to allow access to the lower portion of the heating chamber formed between the walls of the receptacle R, and thus permitting access to the heating element, such as the incandescent lamp L. This door 20 may be held in closed position by a latch or other fastening device not shown.

The apparatus or receptacle R is desirably supported on castors or rollers, or other desired supports, 22, carried on the base or bottom 6, such castors allowing the entire device or apparatus to be moved about as desired.

The apparatus or device shown above allows ready control of any processes of fermentation or other processes in which the materials are placed in the container C and a steady, substantially uniform, mild and controlled heat is supplied by the heating element such as the incandescent lamp L, which heats the air in the spaced chambers between the walls of receptacle R, and allows this air to rise into the entire space surrounding the inner wall 3 of that receptacle R, so that such uniform heat is supplied to the materials undergoing treatment throughout the entire treatment under the control of the operator. Any gases, etc. formed may escape through the opening in the top T.

The use of an incandescent lamp, such as that shown in the drawings for supplying the heat, offers a dry electric heat that keeps the contents from chilling or spoiling, etc.

In utilizing the apparatus or device described above, it may be applied to any desired purposes, such as the production of malt beverages, and particularly beverages having less than one-half percent of alcohol so that they come within the provisions of the National Prohibition Act. The complete control which the operator has of the materials undergoing treatment or fermentation in the apparatus, enables him to produce products which have less than one-half per cent of alcohol.

The mash or other material treated may be made up as desired. For example, a desired mash may be made up by pouring 1 quart of malt syrup into 3 quarts of boiling water, and then boiling the mixture for fifteen to twenty minutes, after which salt (one-half teaspoon) is added, and the boiling mixture is poured into the container C. One pound of granulated sugar is then placed in the container, and four gallons of lukewarm water added. One-half cake of yeast may then be dissolved in an ordinary water glass of luke-warm water, and the yeast and water mixture added to the mixture in the container in from 60 to 90 minutes after the container has been filled with the mixture set forth above. These directions will enable the production of a malt beverage in a quantity approximating five gallons. To heat such a device in preparing materials in this quantity, the incandescent lamp may be a 25 watt bulb, and the whole receptacle maintained in a room of approximately 60° F. in temperature. The scum which appears during the initial treatment disappears after approximately five hours, and the whole product may be considered to be completely treated at the end of thirty-seven hours. The proportions and other conditions specified above, it will be understood are merely illustrative and are given as a specific example of the method of utilizing the structure set forth and described above. The time required in carrying out such processes of preparing malt beverages is, therefore, materially reduced by the present process as compared with prior art processes that do not utilize controlled heating as set forth herein. Furthermore, the continuous supply of controlled and mild heat, and particularly the dry electric heat obtained by such means as the incandescent lamp L, enables ready control and prevents boiling and chilling. The scum disappears largely by evaporation, and therefore cannot fall back into the solution desired so that no deleterious effects are likely to take place. Products prepared in accordance with the present processes and apparatus have been found to carry very little sediment, and such sediment as is present may be readily strained out if desired. The time saved is a very material element in the use of the apparatus and method set forth herein.

As exemplary of the temperatures maintained in the outer chamber of the device, it is desirable to maintain such temperatures within the limits of 100 to 150° F. but under no circumstances should the solution be allowed to boil. In one specific case, operating in a room of temperature of 74° F. with a 30 watt bulb, a temperature of 104° F. was secured in the chamber with a corresponding temperature of 98.5° F. in the solution. For general use operating with room temperatures ordinarily running between 75 and 80° F., a 25 watt incandescent lamp bulb may be utilized.

Various modifications may be utilized in connection with the apparatus disclosed herein. For example, a pan may be placed beneath the apparatus to catch any gum which overflows through the holes in the cover. In addition, a glass peep-hole or sight hole may be supplied in the outer wall of the container, so that the incandescent lamp bulb is visible on the outside. Furthermore, a thermostat arrangement may be utilized in order to keep the heating element at a substantially uniform temperature.

Having thus set forth my invention, I claim:

1. An apparatus for use in the preparation of malt beverages comprising a spaced double walled receptacle for receiving a container for mash or related materials, a container for mash or related materials positioned in the receptacle, the side walls of the container extending above the side walls of the receptacle, a cover provided with a downwardly projecting side wall, said dependent side wall being spaced from the container, and engaging the upper periphery of the outer wall of the receptacle, whereby the spaced walls of the receptacle form a continuous chamber with the passage between the side walls of the cover and the container.

2. An apparatus as set forth in claim 1 provided with means for supplying a mild and controlled heat to the container.

3. An apparatus as set forth in claim 1 including heating means comprising an incandescent lamp positioned between the walls of the receptacle, and means for connecting said lamp to a source of current.

4. An apparatus for use in the preparation of malt beverages comprising a spaced double walled receptacle for receiving a container for mash or related materials, a container for mash or related materials positioned in the receptacle, the side walls of the container extending above the side walls of the receptacle, a cover provided with dependent side walls spaced from the container and engaging the upper periphery of the outer wall of the receptacle, whereby the spaced walls of the receptacle form a continuous chamber with the passage between the side walls of the cover and of the container, means for supplying a mild and controlled heat to the container, and a door in the outer wall of the receptacle allowing access to the heating element.

5. An apparatus as set forth in claim 4 in which the heating element comprises an incandescent lamp positioned between the walls of the receptacle.

JOSEPH O'CALLAGHAN.